United States Patent
Wang

(10) Patent No.: US 12,483,672 B2
(45) Date of Patent: Nov. 25, 2025

(54) METHOD FOR SYNCHRONIZING IMAGES FROM MULTIPLE CHANNELS, AND ELECTRONIC DEVICE

(71) Applicant: Horizon Journey (Hangzhou) Technology Co., Ltd., Zhejiang (CN)

(72) Inventor: Ping Wang, Zhejiang (CN)

(73) Assignee: Horizon Journey (Hangzhou) Technology Co., Ltd., Zhejiang (CN)

( * ) Notice: Subject to any disclaimer, the term of this patent is extended or adjusted under 35 U.S.C. 154(b) by 0 days.

(21) Appl. No.: 18/668,496

(22) Filed: May 20, 2024

(65) Prior Publication Data
US 2024/0397018 A1    Nov. 28, 2024

(30) Foreign Application Priority Data
May 23, 2023   (CN) .......................... 202310587859.6

(51) Int. Cl.
*H04N 7/08* (2006.01)
*G06T 5/00* (2006.01)
*G06T 7/00* (2017.01)

(52) U.S. Cl.
CPC ................ *H04N 7/08* (2013.01); *G06T 5/00* (2013.01); *G06T 7/0002* (2013.01); *G06T 2207/30168* (2013.01)

(58) Field of Classification Search
None
See application file for complete search history.

(56) References Cited

U.S. PATENT DOCUMENTS

| 11,107,177 | B1 * | 8/2021 | Ashley | G06T 1/20 |
| 12,124,269 | B2 * | 10/2024 | Yang | B60R 1/27 |

(Continued)

FOREIGN PATENT DOCUMENTS

| CN | 117708074 A | * 3/2024 | |
| CN | 116366780 B | * 4/2024 | B60R 23/90 |

(Continued)

OTHER PUBLICATIONS

European Search Report for corresponding European Patent Application No. 24176623.7, mailed on Oct. 15, 2024.

(Continued)

*Primary Examiner* — John W Miller
(74) *Attorney, Agent, or Firm* — K&L Gates LLP

(57) ABSTRACT

Disclosed are a method for synchronizing images from multiple channels, a computer readable storage medium, and an electronic device. The method includes: determining, from at least two image transmission channels, target image data corresponding to a target image transmission channel at a preset timepoint; determining a mounting status of a frame identifier of the target image data; determining integrity information of the target image data based on the mounting status; generating the frame identifier of the target image data based on the integrity information; and generating, based on the frame identifier, a to-be-output image corresponding to each image transmission channel in the channels, outputting the to-be-output image. According to this disclosure, image data transmitted in image transmission channels is detected and repaired automatically, which improves efficiency of collecting images from channels and image quality, thereby resolving a problem of asynchronous data when the image data is transmitted in the channels.

17 Claims, 5 Drawing Sheets

(56) References Cited

U.S. PATENT DOCUMENTS

| | | | |
|---|---|---|---|
| 12,175,577 B1 * | 12/2024 | Campbell | H04N 21/41422 |
| 12,175,578 B1 * | 12/2024 | Campbell | G06T 13/00 |
| 2004/0139462 A1 * | 7/2004 | Hannuksela | H04N 19/142 |
| | | | 375/E7.165 |
| 2019/0025773 A1 * | 1/2019 | Yang | G06V 10/803 |
| 2021/0195213 A1 * | 6/2021 | Zhang | H04N 19/172 |
| 2023/0368333 A1 * | 11/2023 | McIntosh | H04N 7/0127 |
| 2024/0146870 A1 * | 5/2024 | Wang | H04N 21/21805 |

FOREIGN PATENT DOCUMENTS

| | | | | |
|---|---|---|---|---|
| DE | 102023136613 A1 * | 7/2024 | | B60W 40/02 |
| TW | I844209 B * | 6/2024 | | H04N 23/90 |
| WO | 2023/280206 A1 | 1/2023 | | |

OTHER PUBLICATIONS

First Japanese Office Action from the corresponding Japanese Patent Application No. 2024-078462, mailed on Mar. 25, 2025 and its English translation.

* cited by examiner

METHOD FOR SYNCHRONIZING IMAGES FROM MULTIPLE CHANNELS, AND ELECTRONIC DEVICE

RELATED APPLICATION INFORMATION

This application claims priority to and the benefit of Chinese patent application Ser. No. 202310587859.6 filed on May 23, 2023, incorporated herein by reference.

FIELD OF THE INVENTION

This disclosure relates to the technical filed of computers, and in particular, to a method and an apparatus for synchronizing images from multiple channels, a computer readable storage medium, and an electronic device.

BACKGROUND OF THE INVENTION

With development of image processing technologies, it is currently required in many fields to use a plurality of cameras to capture a same scene. Image data captured by different cameras is generally transmitted and processed through different channels, while the different channels may cause different delays to transmission and processing of the image data. For example, in the field of intelligent driving, a plurality of images captured by multiple cameras need to be processed synchronously to truly reflect a situation of a vehicle at a certain time. Improper synchronization processing may lead to serious accidents. Therefore, how to ensure synchronization of image frames output from different channels in shooting time when image data captured by different cameras is transmitted through various channels is a problem that needs to be resolved.

SUMMARY OF THE INVENTION

To resolve the foregoing technical problem, embodiments of this disclosure provide a method and an apparatus for synchronizing images from multiple channels, a computer readable storage medium, and an electronic device, so as to resolve a problem that it is difficult to synchronize image data in different channels in shooting time due to delays in transmission and processing.

An embodiment of this disclosure provides a method for synchronizing images from multiple channels. The method includes: determining, from at least two image transmission channels, target image data corresponding to a target image transmission channel at a preset timepoint; determining a mounting status of a frame identifier of the target image data; determining integrity information of the target image data based on the mounting status; generating the frame identifier of the target image data based on the integrity information; and generating, based on the frame identifier, a to-be-output image corresponding to each image transmission channel in the at least two image transmission channels, and outputting the to-be-output image.

According to another aspect of an embodiment of this disclosure, an apparatus for synchronizing images from multiple channels is provided. The apparatus includes: a first determining module, configured to determine, from at least two image transmission channels, target image data corresponding to a target image transmission channel at a preset timepoint; a second determining module, configured to determine a mounting status of a frame identifier of the target image data; a third determining module, configured to determine integrity information of the target image data based on the mounting status; a generation module, configured to generate the frame identifier of the target image data based on the integrity information; and an output module, configured to generate, based on the frame identifier, a to-be-output image corresponding to each image transmission channel in the at least two image transmission channels, and output the to-be-output image.

According to another aspect of an embodiment of this disclosure, a computer readable storage medium is provided. The computer readable storage medium stores a computer program, and the computer program is used to be executed by a processor to implement the method for synchronizing images from multiple channels.

According to another aspect of an embodiment of this disclosure, an electronic device is provided. The electronic device includes: a processor; and a memory configured to store processor-executable instructions. The processor is configured to read the executable instructions from the memory, and execute the instructions to implement the method for synchronizing images from multiple channels.

According to another aspect of an embodiment of this disclosure, a computer program product is provided. The computer program product includes computer program instructions. When the computer program instructions are executed by a processor, the method for synchronizing images from multiple channels provided in this disclosure is implemented.

Based on the method and the apparatus for synchronizing images from multiple channels, the computer readable storage medium, and the electronic device that are provided in the foregoing embodiments of this disclosure, a frame number and data integrity of the image data transmitted in the at least two image transmission channels are detected to generate the frame identifier of the image data; the to-be-output image is generated by processing the image data in each image transmission channel; and images corresponding to the frame identifier are respectively output through the image transmission channels. In this way, image data transmitted in a plurality of image transmission channels is detected and repaired automatically, which improves efficiency of collecting images from a plurality of channels and image quality. At the same time, by detecting and adjusting the frame identifier of the image data during transmission of the image data in a plurality of channels, frame identifiers of images captured by a plurality of cameras may be remained consistent during entire transmission processes in various image transmission channels. This helps a user extract images captured at a same timepoint from images output from the various image transmission channels, so as to ensure synchronization of the image data when transmitted in a plurality of image transmission channels.

The technical solutions of this disclosure are further described below in detail with reference to the accompanying drawings and the embodiments.

BRIEF DESCRIPTION OF THE DRAWINGS

By describing the embodiments of this disclosure more detailed with reference to the accompanying drawings, the foregoing and other objectives, features, and advantages of this disclosure will become more apparent. The accompanying drawings are used to provide further understanding of the embodiments of this disclosure, constitute a part of the specification, are used to explain this disclosure together with the embodiments of this disclosure, and do not consti

DETAILED DESCRIPTION OF THE EMBODIMENTS

To explain this disclosure, exemplary embodiments of this disclosure are described below in detail with reference to accompanying drawings. Obviously, the described embodiments are merely a part, rather than all of embodiments of this disclosure. It should be understood that this disclosure is not limited by the exemplary embodiments.

It should be noted that unless otherwise specified, the scope of this disclosure is not limited by relative arrangement, numeric expressions, and numerical values of components and steps described in these embodiments.

Application Overview

To achieve synchronization of images captured by a plurality of cameras in shooting time, a commonly used manner is to synchronously control shooting actions of the cameras, so that data captured by the cameras can be output synchronously. However, during data transmission, data in various channels cannot be processed simultaneously in each module due to factors such as different transmission channels, different processing manners of an image processing module, and different environments in which programs are run. As a result, the images output from various channels are asynchronous in time.

In addition, according to current solutions, abnormal issues cannot be automatically analyzed when data is transmitted in different image processing modules. Analysis of the abnormal issues requires participation of technical personnels, which results in low data processing efficiency, and thus requirements for scenarios such as autonomous driving cannot be met.

To resolve the foregoing problem, embodiments of this disclosure provide a method for synchronizing images from multiple channels. According to this method, frame identifier detection and data integrity detection may be performed during a process in which image data is transmitted in a plurality of channels; and finally, images with a same frame identifier may be output from the plurality of channels. In this way, multiple channels of image data is synchronously output after being transmitted.

Exemplary System

Figure 1:
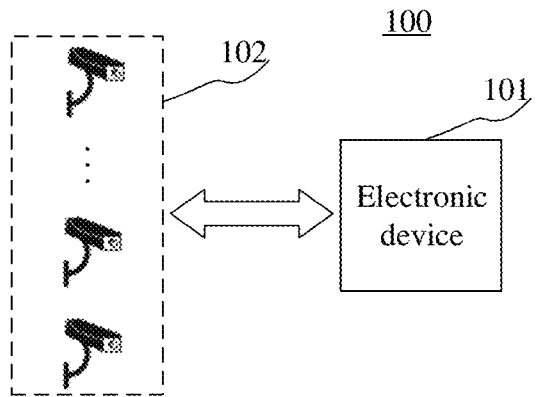
- FIG. 1 is a diagram of a system to which this disclosure is applicable.

FIG. 1 illustrates an exemplary system architecture 100 to which a method for synchronizing images from multiple channels or an apparatus for synchronizing images from multiple channels according to embodiments of this disclosure may be applicable.

As shown in FIG. 1, the system architecture 100 may include an electronic device 101 and at least two cameras 102.

The at least two cameras 102 may be connected to the electronic device through various types of connection manners, such as wired and wireless communication links, or fiber optic cables.

The at least two cameras 102 are configured to capture target scenes, which may be various types of scenes. For example, when the at least two cameras 102 are disposed on a vehicle, the target scene is a road, a parking lot, or another scene where the vehicle is located. The at least two cameras 102 may capture a surrounding environment of the vehicle.

At least two image transmission channels may be disposed on the electronic device. Each image transmission channel corresponds to one camera, and there is an image processing module disposed on each image transmission channel. Image data captured by the camera is transmitted in the corresponding image transmission channel, and is output from the corresponding image transmission channel after being processed by the image processing module.

The electronic device 101 may be any type of electronic device, including but not limited to dedicated devices such as an image processing dedicated chip and an image processing dedicated circuit board; mobile universal terminals such as a vehicle-mounted terminal, a mobile phone, a notebook, and a PAD (tablet computer); and fixed universal terminals such as a digital television and a desktop computer.

The method for synchronizing images from multiple channels provided in the embodiments of this disclosure is implemented by the electronic device 101. Correspondingly, the apparatus for synchronizing images from multiple channels may be disposed in the electronic device 101.

It should be understood that quantities of electronic devices and cameras in FIG. 1 are only for examples. According to implementation requirements, there may be any quantities of electronic devices and cameras.

Exemplary Method

Figure 2:
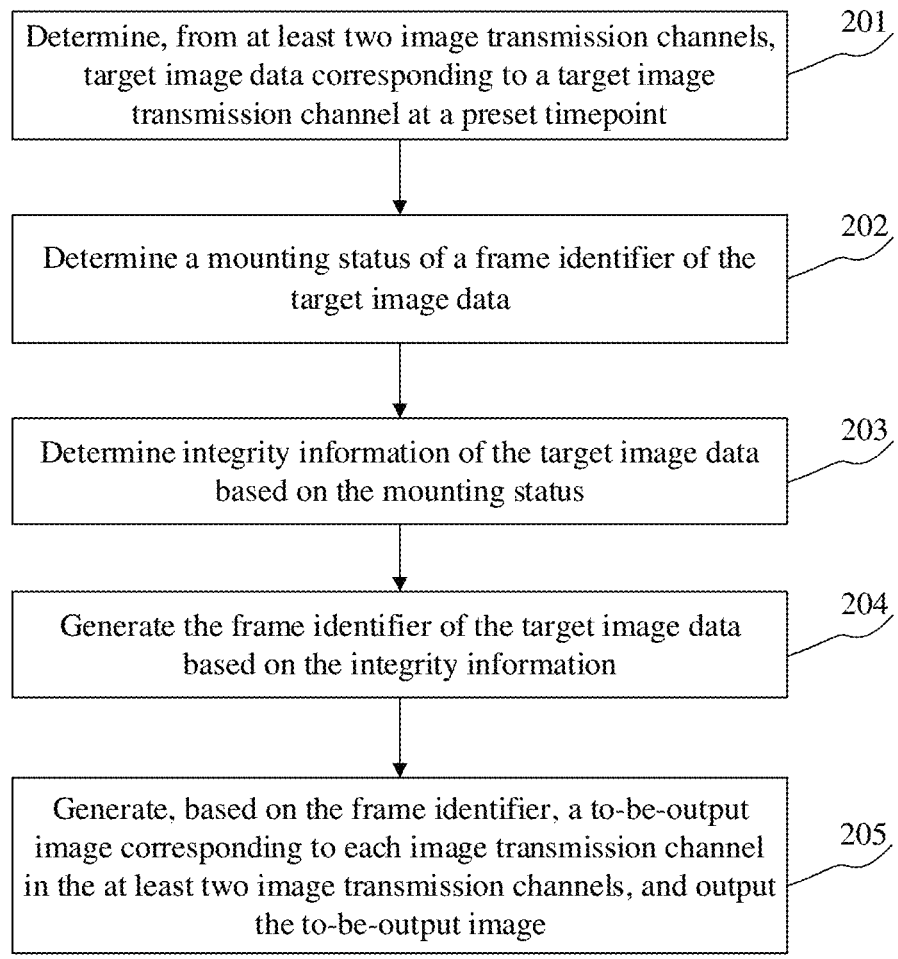
FIG. 2 is a schematic flowchart of a method for synchronizing images from multiple channels according to an exemplary embodiment of this disclosure.

FIG. 2 is a schematic flowchart of a method for synchronizing images from multiple channels according to an exemplary embodiment of this disclosure. This embodiment may be applied to an electronic device (such as an electronic device 101 shown in FIG. 1). As shown in FIG. 2, the method includes the following steps.

Step 201. Determine, from at least two image transmission channels, target image data corresponding to a target image transmission channel at a preset timepoint.

The target image transmission channel may be any one of the at least two image transmission channels. The preset timepoint may be a specified fixed timepoint or a shooting timepoint of a camera corresponding to the target image transmission channel. The target image data may be data captured by the camera corresponding to the target image transmission channel. Usually, the target image data may be data on which no image processing operations are performed. For example, the target image data may be raw data collected by a sensor of the camera.

Step 202. Determine a mounting status of a frame identifier of the target image data.

The frame identifier may be a marker for distinguishing between image data captured at different timepoints, and is usually related to the shooting timepoint of the image data. For example, the frame identifier may include, but is not limited to at least one of the following items: an image frame number and a timestamp representing a shooting timepoint of an image. Usually, after a frame of image data is captured, a frame identifier may be generated for the image data. This process is referred to as frame mounting. The mounting status may include successful mounting and failed mounting. If the image data is missed or incomplete due to failures in software or hardware, failed mounting may be caused to the frame identifier.

Step 203. Determine integrity information of the target image data based on the mounting status.

The integrity information indicates a level of integrity of the target image data. For example, the integrity information may be a quantity of rows that fail to be verified after data verification (such as CRC (cyclic redundancy check)) is performed on each row of image data, or may be a proportion of the rows that fail to be verified to a total quantity of rows. If the mounting status is mounting failed, the integrity information needs to be obtained to further determine whether the frame identifier of the target image data is repairable.

Step 204. Generate the frame identifier of the target image data based on the integrity information.

Specifically, if the integrity information indicates that the target image data is complete (for example, if a proportion of rows that are successfully verified to the total quantity of rows is greater than a preset proportion), the frame identifier of the target image data may be generated. For example, the method for generating the frame identifier may be obtaining shooting time of the recorded target image data, and generating the frame identifier based on a timestamp of the shooting time.

Step 205. Generate, based on the frame identifier, a to-be-output image corresponding to each image transmission channel in the at least two image transmission channels, and output the to-be-output image.

Specifically, during transmission of the target image data in each image transmission channel, a pre-configured image processing module (such as an ISP (image signal processing) model) may be used to process the target image data, to obtain the to-be-output image. A plurality of to-be-output images corresponding to a same frame identifier have same or similar shooting time. Therefore, the electronic device may simultaneously output the to-be-output images with the same frame identifier that are generated in various image transmission channels.

Optionally, for the foregoing frame identifier, if a processed image corresponding to the frame identifier is obtained from each image transmission channel, or if a quantity of obtained processed images corresponding to the frame identifier is greater than or equal to a preset quantity, these processed images may be determined as to-be-output images, which may be output simultaneously. If the quantity of the obtained processed images corresponding to the frame identifier is less than the preset quantity, the processed images corresponding to the frame identifier may be discarded, and the step 201 may be repeated.

Based on the method provided in the foregoing embodiment of this disclosure, a frame number and data integrity of the image data transmitted in the at least two image transmission channels are detected to generate the frame identifier of the image data; the to-be-output image is generated by processing the image data in each image transmission channel; and images corresponding to the frame identifier are respectively output through the various image transmission channels. In this way, image data transmitted in a plurality of image transmission channels is detected and repaired automatically, which improves efficiency of collecting images from multiple channels and image quality. At the same time, by detecting and adjusting the frame identifier of the image data during transmission of the image data in a plurality of channels, frame identifiers of images captured by a plurality of cameras may be remained consistent during entire transmission processes in various image transmission channels. This helps a user extract images captured at a same timepoint from images output from the various image transmission channels, so as to ensure synchronization of the image data when transmitted in a plurality of image transmission channels.

Figure 3:
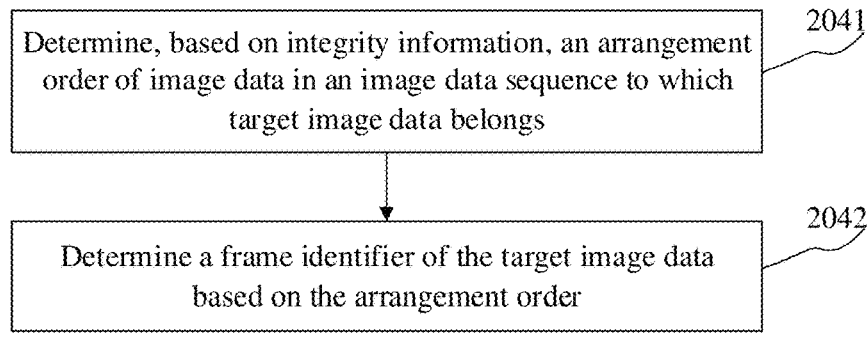
FIG. 3 is a schematic flowchart of a method for synchronizing images from multiple channels according to another exemplary embodiment of this disclosure.

In some optional implementations, as shown in FIG. 3, step 204 includes the following steps.

Step 2041. Determine, based on the integrity information, an arrangement order of image data in an image data sequence to which the target image data belongs.

Specifically, multiple pieces of image data transmitted in each image transmission channel may be determined as an image data sequence. When there is no data anomalies, there is an arrangement order for frame identifiers of the image data in the image data sequence. If there is a data anomaly, that is, the foregoing complete information indicates that the target image data is not complete, it is needed to generate frame identifiers for the target image data according to an order of frame identifiers.

For example, when the integrity information indicates that the target image data is complete, the order of the frame identifiers of the image data in the current image data sequence may be directly determined as the arrangement order of the image data. When the integrity information indicates that the target image data is incomplete, the target image data may be repaired. After repairing is completed, certain time is required for the repairing, and the frame identifiers may be out of order during this period. Therefore, it is needed to reorder the image data sequence based on timestamps of image data in the current image data sequence.

Step 2042. Determine the frame identifier of the target image data based on the arrangement order.

For example, the frame identifier includes a frame number and a timestamp. If a frame previous to a current frame (that is, the target image data) has a frame number of 1 and a timestamp is t1, and the current frame has a timestamp of t2, a frame number of the current frame is set to 2. If the previous frame has a frame number of 3 and a timestamp of t3, the current frame has a timestamp of t5, and a frame having a frame number of 4 and a timestamp of t4 is not obtained due to a certain fault, the frame number of the current frame is set to 5.

In this embodiment, the frame identifier of the target image data may be generated accurately based on the arrangement order of the image data in the image data sequence, so that the frame identifier of the target image data can accurately indicate the shooting time of the target image data. This helps improve accuracy of synchronous transmission and output of the image data transmitted in a plurality of image transmission channels.

Figure 4:
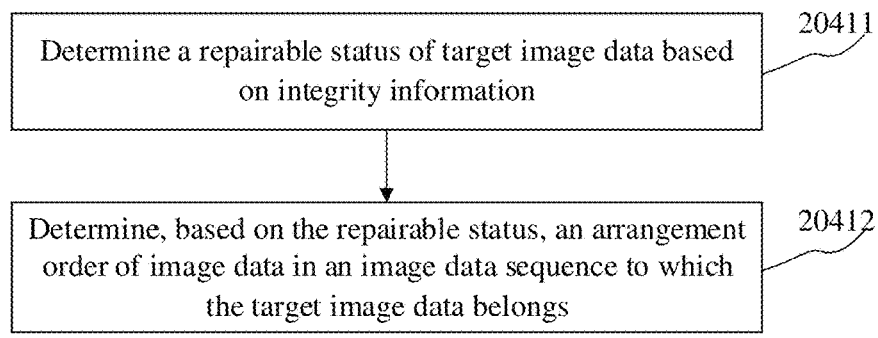
FIG. 4 is a schematic flowchart of a method for synchronizing images from multiple channels according to another exemplary embodiment of this disclosure.

In some optional implementations, as shown in FIG. 4, step 2041 includes the following steps.

Step 20411. Determine a repairable status of the target image data based on the integrity information.

Specifically, because the integrity information may indicate a level of integrity of a data volume of the target image data, it may be determined that the repairable status of the target image data is repairable when the integrity information indicates that the level of integrity reaches a set threshold. If the integrity information indicates that the level of integrity does not reach the set threshold, it is determined that the repairable status of the target image data is irreparable.

Step 20412. Determine, based on the repairable status, the arrangement order of the image data in the image data sequence to which the target image data belongs.

Specifically, if the repairable status indicates that the target image data is repairable but no repairing is required (for example, if integrity of the target image data is greater than 95%), an arrangement order of the frame identifiers of the image data in the image data sequence is determined as the arrangement order of the image data. The target image data is repaired if the repairable status indicates that the target image data is repairable and repairing is required (for example, if the integrity of the target image data is less than or equal to 95% and greater than 70%). After the repairing is completed, the arrangement order of the image data sequence containing the repaired target image data is redetermined based on the timestamp of each piece of image data.

According to this embodiment, a position of the target image data in the image data sequence is determined purposely based on integrity of the image, which helps improve accuracy of generating the frame identifier of the target image data.

In some optional implementations, step 20412 may be performed as below.

First, the target image data is repaired if the repair status represents a repairable status.

There may be a lot of methods for repairing the target image data. For example, the target image data is repaired by using a convolutional neural network. Alternatively, a value with an error is determined from the target image data through CRC verification, and interpolation is performed by using values surrounding the value with an error, so as to obtain the repaired target image data.

Subsequently, the arrangement order of the image data in the image data sequence to which the repaired target image data belongs is adjusted.

Usually, because certain time is required for repairing the target image data, new image data may be received during this time period. As a result, the image data in the image data sequence to which the target image data belongs is out of order. Therefore, after the target image data is repaired, the image data in the image data sequence may be reordered by using the timestamp and the like.

According to this embodiment, the image data is detected and repaired automatically by repairing the target image data and adjusting the arrangement order of the image data when the target image data has an anomaly and is repairable. This helps improve continuity of images transmitted in a same image transmission channel.

In some optional implementations, the method further includes:

discarding the target image data if the repair status indicates that the target image data is irreparable, and discarding image data corresponding to the preset timepoint that is transmitted in the at least two image transmission channels.

Specifically, image data with a timestamp consistent with that of the shooting time of the target image data (or a timestamp difference is smaller than a preset time difference) may be discarded from other channels in the at least two image transmission channels.

Usually, if the target image data in the target image transmission channel is irreparable, a discarding notification may be sent to a thread corresponding to another channel. After receiving the discarding notification, the thread corresponding to the other channel may discard the image data corresponding to the preset timepoint.

According to this embodiment, when a failure occurs to image data in a certain image transmission channel at a certain timepoint and the image data is irreparable, corresponding image data in other image transmission channels is also discarded. In this way, a problem of inconsistent shooting time of images finally output from various image transmission channels is avoided.

Figure 5:
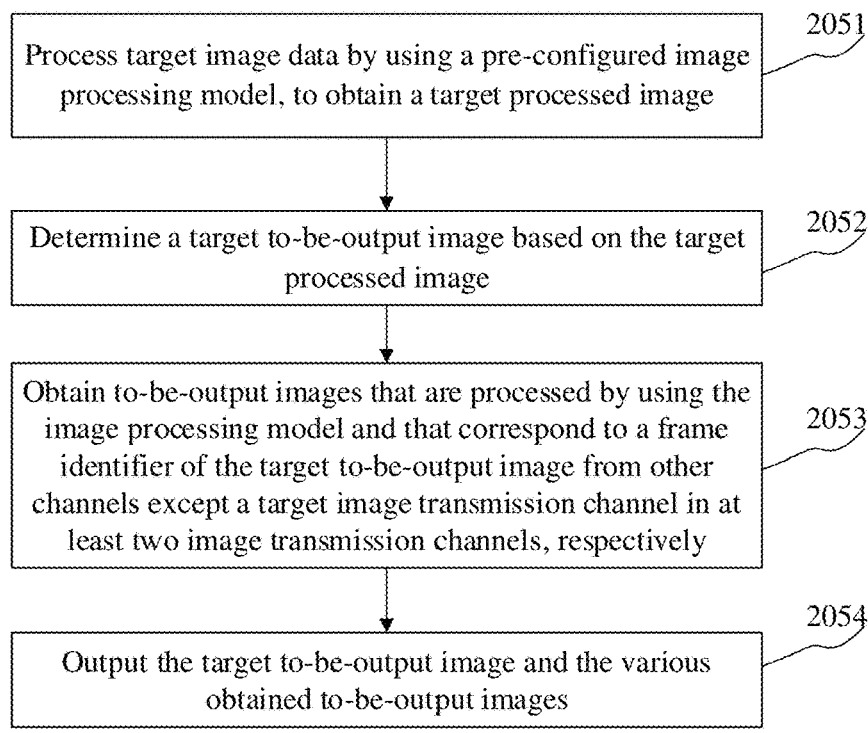
FIG. 5 is a schematic flowchart of a method for synchronizing images from multiple channels according to another exemplary embodiment of this disclosure.

In some optional implementations, as shown in FIG. 5, step 205 includes the following steps.

Step 2051. Process the target image data by using a pre-configured image processing model, to obtain a target processed image.

The image processing model may be a model that processes the target image data in various ways. For example, the image processing model may be an ISP model, which includes a plurality of image processing modules, such as a white balance module, a color difference module, and a color correction module.

Step 2052. Determine a target to-be-output image based on the target processed image.

Specifically, the target processed image may be directly determined as the target to-be-output image. Alternatively, a frame identifier of the target processed image may be determined. When the frame identifier does not conform to an arrangement order of the processed images in the image transmission channel, the processed images are reordered and to-be-output images at a current timepoint are determined sequentially.

Step 2053. Obtain to-be-output images that are processed by using the image processing model and that correspond to a frame identifier of the target to-be-output image from other channels except the target image transmission channel among the at least two image transmission channels, respectively.

Specifically, shooting time of various images corresponding to a same frame identifier is the same or similar (for example, a timestamp difference between the shooting time of the images is smaller than the preset time difference). Therefore, all images corresponding to the same frame identifier are determined as the to-be-output images at the current timepoint.

Step 2054. Output the target to-be-output image and the obtained to-be-output images.

The currently output images in this step are images captured by a plurality of cameras at a same timepoint, which may reflect situations of a target scene in different shooting directions at a same shooting timepoint.

In this embodiment, images corresponding to a same frame identifier are output after the target image data and the image data from other image transmission channels are processed by using the image processing model. In this way, images from various channels that are output at a same timepoint are kept consistent in shooting time, thereby resolving a problem of asynchronous shooting time of output images due to differences in transmission channels of the image data in various channels and delays in processing the image data in the various channels by the image processing model.

Figure 6:
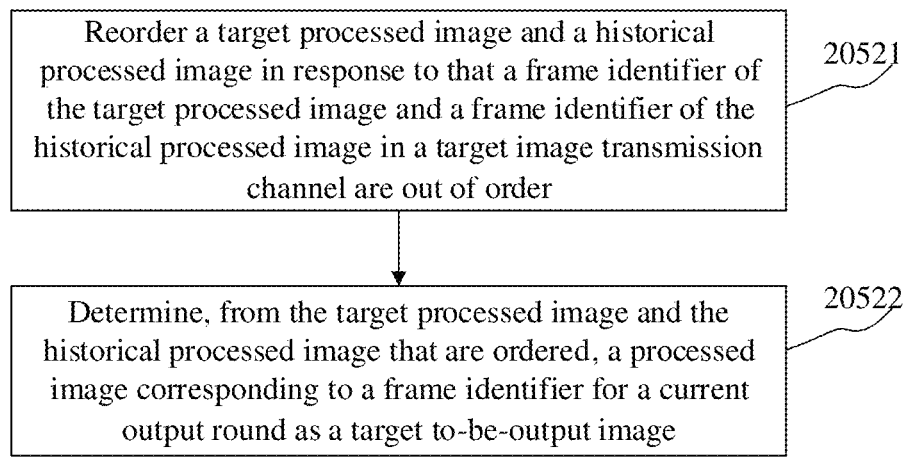
FIG. 6 is a schematic flowchart of a method for synchronizing images from multiple channels according to another exemplary embodiment of this disclosure.

In some optional implementations, as shown in FIG. 6, step 2052 includes the following steps.

Step 20521. Reorder the target processed image and a historical processed image in response to that a frame identifier of the target processed image and a frame identifier of the historical processed image in the target image transmission channel are out of order.

Specifically, due to differences in transmission channels of the image data and differences in processing time of the image processing model, processed images generated in an image transmission channel are not generated according to the order of the frame identifiers. For example, data processed by some modules in the image processing model needs to be temporarily stored in a memory, and waits for other modules to be extracted from the memory to continue processing, which results in discontinuous frame identifiers of the processed images in the channel. In this case, it is needed to reorder the processed images.

Step 20522. Determine, from the target processed image and the historical processed image that are ordered, a processed image corresponding to a frame identifier for a current output round as the target to-be-output image.

Specifically, the image transmission channels output images sequentially according to the output round, and an order of rounds is consistent with that of the frame identifiers. Therefore, to ensure that the frame identifiers of the images output from the various image transmission channels are consistent and continuous, each image transmission channel needs to output the images sequentially according to the order of the frame identifiers. For example, if a frame identifier of an image output in a previous round is 3, an image with a frame identifier of 4 needs to be output in this round. However, actually, after processing of the image processing model, an image with a frame identifier of 6 is first obtained, and then an image with a frame identifier of 5 is obtained. In other words, the frame identifiers are out of order. In this case, reordering is required first, so as to place the image with the frame identifier of 5 before the image with the frame identifier of 6. Subsequently, if the image with the frame identifier of 4 is obtained again, reordering is performed again. Moreover, if a frame identifier corresponding to a current round is 4, the image with the frame identifier of 4 is used as the target to-be-output image.

According to this embodiment, the processed images generated at various timepoints are reordered in the target image transmission channel. In this way, the processed images are ordered according to shooting time in the channels, thereby avoiding confusion in an order of images output from a single channel, which helps efficiently achieve consistency of frame identifiers of images output from a plurality of channels.

Figure 7:
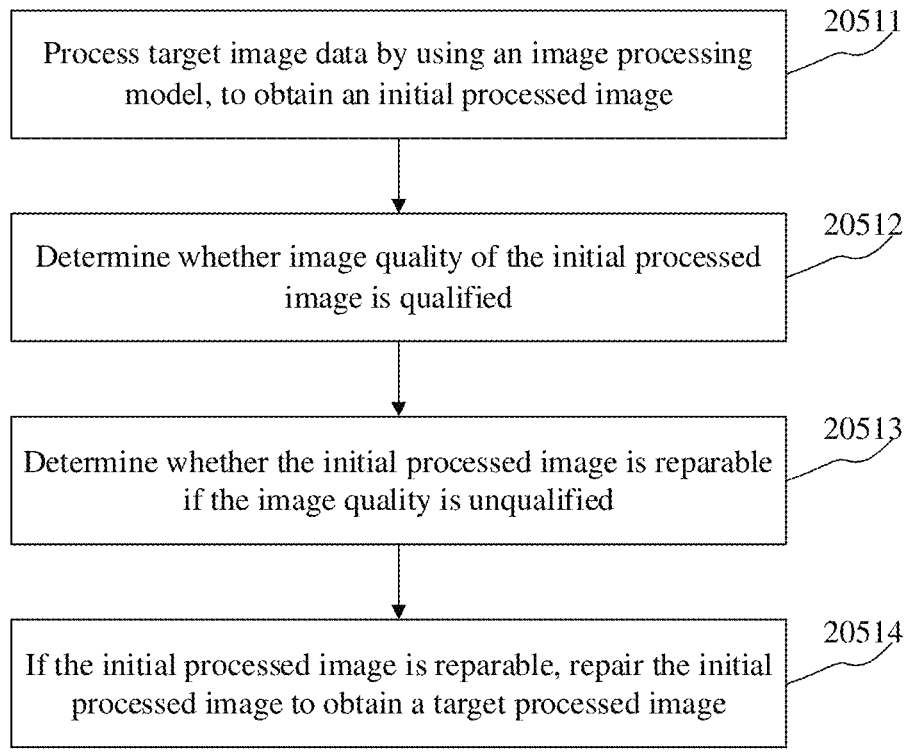
FIG. 7 is a schematic flowchart of a method for synchronizing images from multiple channels according to another exemplary embodiment of this disclosure.

In some optional implementations, as shown in FIG. 7, step 2051 includes the following steps.

Step 20511. Process the target image data by using the image processing model, to obtain an initial processed image.

Step 20512. Determine whether image quality of the initial processed image is qualified.

There may be a lot of methods for determining whether the image quality is qualified. For example, defective pixel detection may be performed on the processed image to determine a quantity of defective pixels. If the quantity of defective pixels is greater than or equal to a first preset quantity threshold, it is determined that the image quality is unqualified. For another example, CRC verification is performed on the image. If a verification result is that a quantity of abnormal rows is greater than or equal to a first preset row quantity threshold, it is determined that the image quality is unqualified.

Step 20513. Determine whether the initial processed image is reparable if the image quality is unqualified.

For example, if the quantity of defective pixels is greater than or equal to a second preset quantity threshold, it is determined that the image is irreparable. For another example, if the quantity of abnormal rows is greater than or equal to a second preset row quantity threshold, it is determined that the image is irreparable.

Optionally, if the image quality is qualified, the initial processed image may be directly determined as the target processed image.

Step 20514. If the initial processed image is reparable, repair the initial processed image to obtain the target processed image.

There may be a lot of methods for repairing the initial processed image. For example, a defective pixel correction module of an ISP image processing model is used to repair the initial processed image, or a convolutional neural network is used to repair the initial processed images.

According to this embodiment, image quality of the images processed by the image processing model is assessed, and unqualified images are repaired, so that the generated processed images are automatically detected and repaired in a process of transmitting images in a plurality of channels. In this way, continuity of processed images generated in a same image transmission channel is improved.

In some optional implementations, after step 5013, the method further includes:

discarding the initial processed image if the initial processed image is irreparable, and discarding image data in the at least two image transmission channels that corresponds to a frame identifier of the initial processed image.

Specifically, if the initial processed image in the target image transmission channel is irreparable, a discarding notification may usually be sent to a thread corresponding to another channel. After receiving the discarding notification, the thread corresponding to the other channel may discard the image data corresponding to the frame identifier of the initial processed image.

It should be noted that the image data corresponding to the frame identifier of the initial processed image herein is not limited to the image data received from the camera and the processed images obtained through processing of the image processing model. At any stage of image transmission and processing, if a signal indicating that the initial processed image is irreparable is triggered, any type of image data corresponding to the foregoing frame identifier may be discarded.

According to this embodiment, when a failure occurs to a processed image generated in a certain image transmission channel at a certain timepoint and the processed image is irreparable, corresponding image data in other image transmission channels is also discarded. In this way, a problem of inconsistent shooting time of images finally output from various image transmission channels is avoided.

Exemplary Apparatus

Figure 8:
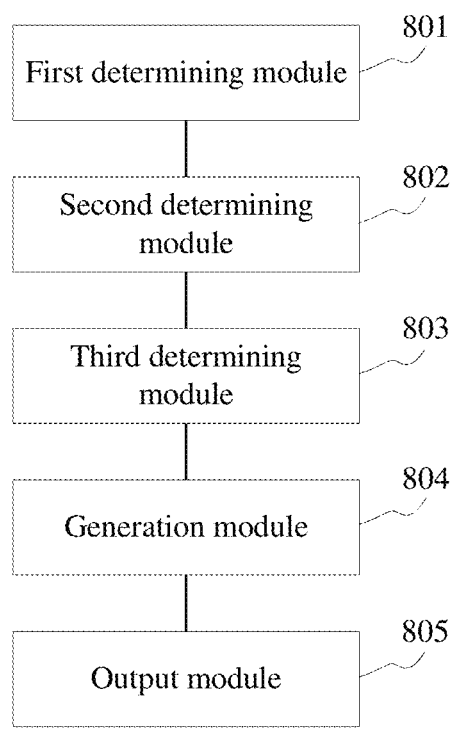
FIG. 8 is a schematic diagram of a structure of an apparatus for synchronizing images from multiple channels according to an exemplary embodiment of this disclosure.

FIG. 8 is a schematic diagram of a structure of an apparatus for synchronizing images from multiple channels according to an exemplary embodiment of this disclosure. This embodiment may be applied to an electronic device. As shown in FIG. 8, the apparatus for synchronizing images from multiple channels includes: a first determining module 801, configured to determine, from at least two image transmission channels, target image data corresponding to a target image transmission channel at a preset timepoint; a second determining module 802, configured to determine a mounting status of a frame identifier of the target image data; a third determining module 803, configured to determine integrity information of the target image data based on the mounting status; a generation module 804, configured to generate the frame identifier of the target image data based on the integrity information; and an output module 805, configured to generate, based on the frame identifier, a to-be-output image corresponding to each image transmission channel in the at least two image transmission channels, and output the to-be-output image.

In this embodiment, the first determining module 801 determines, from the at least two image transmission channels, the target image data corresponding to the target image transmission channel at the preset timepoint.

The target image transmission channel may be any one of the at least two image transmission channels. The preset timepoint may be a specified fixed timepoint or a shooting timepoint of a camera corresponding to the target image transmission channel. The target image data may be data captured by the camera corresponding to the target image transmission channel. Usually, the target image data may be data on which no image processing operations are performed. For example, the target image data may be raw data collected by a sensor of the camera.

In this embodiment, the second determining module 802 determines the mounting status of the frame identifier of the target image data.

The frame identifier may be a marker for distinguishing between image data captured at different timepoints, and is usually related to the shooting timepoint of the image data. For example, the frame identifier may include, but is not limited to at least one of the following items: an image frame number and a timestamp representing a shooting timepoint of an image. Usually, after a frame of image data is captured, a frame identifier may be generated for the image data. This process is referred to as frame mounting. The mounting status may include successful mounting and failed mounting. If the image data is missed or incomplete due to failures in software or hardware, failed mounting may be caused to the frame identifier.

In this embodiment, the third determining module 803 determines integrity information of the target image data based on the mounting status.

The integrity information indicates a level of integrity of the target image data. For example, the integrity information may be a quantity of rows that fail to be verified after data verification (such as CRC (cyclic redundancy check)) is performed on each row of image data, or may be a proportion of the rows that fail to be verified to a total quantity of rows. If the mounting status is mounting failed, the integrity information needs to be obtained to further determine whether the frame identifier of the target image data is repairable.

In this embodiment, the generation module 804 generates the frame identifier of the target image data based on the integrity information.

Specifically, if the integrity information indicates that the target image data is complete (for example, if a proportion of rows that are successfully verified to the total quantity of rows is greater than a preset proportion), the frame identifier of the target image data may be generated. For example, the method for generating the frame identifier may be obtaining shooting time of the recorded target image data, and generating the frame identifier based on a timestamp of the shooting time.

In this embodiment, the output module 805 generates, based on the frame identifier, the to-be-output image corresponding to each image transmission channel in the at least two image transmission channels, and outputs the to-be-output image.

Specifically, during transmission of the target image data in each image transmission channel, a pre-configured image processing module (such as an ISP (image signal processing) model) may be used to process the target image data, to obtain the to-be-output image. A plurality of to-be-output images corresponding to a same frame identifier have same or similar shooting time. Therefore, the output module 805 may simultaneously output the to-be-output images with the same frame identifier that are generated in various image transmission channels.

Figure 9:
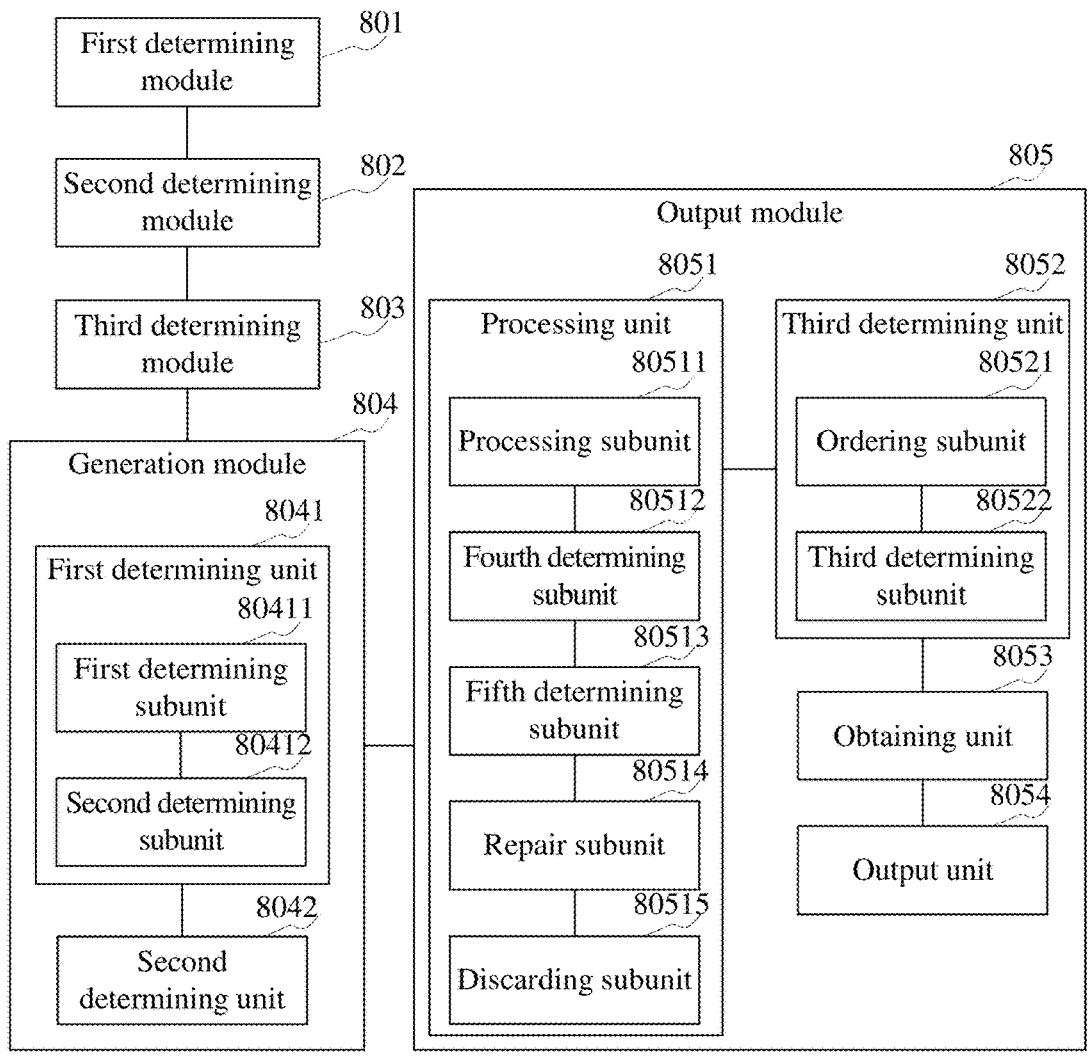
FIG. 9 is a schematic diagram of a structure of an apparatus for synchronizing images from multiple channels according to another exemplary embodiment of this disclosure.

Referring to FIG. 9, FIG. 9 is a schematic diagram of a structure of an apparatus for synchronizing images from multiple channels according to another exemplary embodiment of this disclosure.

In some optional implementations, the generation module 804 includes: a first determining unit 8041, configured to determine, based on the integrity information, an arrangement order of image data in an image data sequence to which the target image data belongs; and a second determining unit 8042, configured to determine the frame identifier of the target image data based on the arrangement order.

In some optional implementations, the first determining unit 8041 includes: a first determining subunit 80411, configured to determine a repairable status of the target image data based on the integrity information; and a second determining subunit 80412, configured to determine, based on the repairable status, the arrangement order of the image data in the image data sequence to which the target image data belongs.

In some optional implementations, the second determining subunit 80412 is further configured to: repair the target image data if the repair status represents a repairable status; and adjust the arrangement order of the image data in the image data sequence to which the repaired target image data belongs.

In some optional implementations, the second determining subunit 80412 is further configured to: if the repair status indicates that the target image data is irreparable, discard the target image data, and discard image data corresponding to the preset timepoint that is transmitted in the at least two image transmission channels.

In some optional implementations, the output module 805 includes: a processing unit 8051, configured to process the target image data by using a pre-configured image processing model, to obtain a target processed image; a third determining unit 8052, configured to determine a target to-be-output image based on the target processed image; an obtaining unit 8053, configured to obtain to-be-output images that are processed by using the image processing model and that correspond to a frame identifier of the target to-be-output image from other channels except the target image transmission channel among the at least two image transmission channels, respectively; and an output unit

8054, configured to output the target to-be-output image and the obtained to-be-output images.

In some optional implementations, the third determining unit 8052 includes: an ordering subunit 80521, configured to reorder the target processed image and a historical processed image in response to that a frame identifier of the target processed image and a frame identifier of the historical processed image in the target image transmission channel are out of order; and a third determining subunit 80522, configured to determine, from the target processed image and the historical processed image that are reordered, a processed image corresponding to a frame identifier for a current output round as the target to-be-output image.

In some optional implementations, the processing unit 8051 includes: a processing subunit 80511, configured to process the target image data by using the image processing model, to obtain an initial processed image; a fourth determining subunit 80512, configured to determine whether image quality of the initial processed image is qualified; a fifth determining subunit 80513, configured to determine whether the initial processed image is reparable if the image quality is unqualified; and a repair subunit 80514, configured to repair the initial processed image to obtain the target processed image if the initial processed image is reparable.

In some optional implementations, the processing unit 8051 further includes: a discarding subunit 80515, configured to discard the initial processed image if the initial processed image is irreparable, and discard image data in the at least two image transmission channels that corresponds to a frame identifier of the initial processed image.

Based on the apparatus for synchronizing images from multiple channels in the foregoing embodiment of this disclosure, a frame number and data integrity of the image data transmitted in the at least two image transmission channels are detected to generate the frame identifier of the image data; the to-be-output image is generated by processing the image data in each image transmission channel; and images corresponding to the frame identifier are respectively output through the various image transmission channels. In this way, image data transmitted in a plurality of image transmission channels is detected and repaired automatically, which improves efficiency of collecting images from a plurality of channels and image quality. At the same time, by detecting and adjusting the frame identifier of the image data during transmission of the image data in a plurality of channels, frame identifiers of images captured by a plurality of cameras may remain consistent during entire transmission processes in various image transmission channels. This helps a user extract images captured at a same timepoint from images output from the various image transmission channels, so as to ensure synchronization of the image data when transmitted in a plurality of image transmission channels.

Exemplary Electronic Device

An electronic device according to an embodiment of this disclosure is described below with reference to FIG. 10. The electronic device may be an electronic device 101 shown in FIG. 1.

Figure 10:
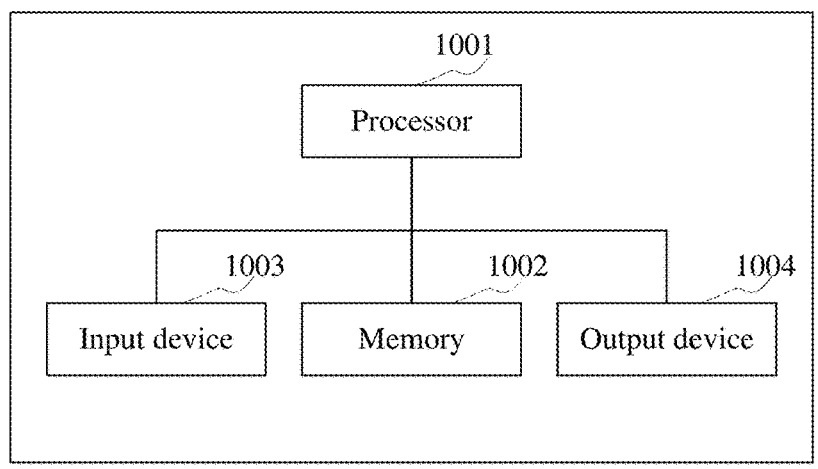
FIG. 10 is a diagram of a structure of an electronic device according to an exemplary embodiment of this disclosure.

FIG. 10 shows a block diagram of an electronic device according to an embodiment of this disclosure.

As shown in FIG. 10, the electronic device includes one or more processors 1001 and a memory 1002.

The processor 1001 may be a central processing unit (CPU) or another form of processing unit having data processing capability and/or instructions execution capability, and may control another component in the electronic device to perform a desired function.

The memory 1002 may include one or more computer program products. The computer program product may include various forms of computer readable storage media, such as a volatile memory and/or a non-volatile memory. The volatile memory may include, for example, a random access memory (RAM) and/or a cache. The nonvolatile memory may include, for example, a read-only memory (ROM), a hard disk, and a flash memory. One or more computer program instructions may be stored on the computer readable storage medium. The processor 1001 may execute the program instructions to implement the method for synchronizing images from multiple channels according to various embodiments of this disclosure that are described above and/or other desired functions. Various contents such as image data may also be stored in the computer readable storage medium.

In an example, the electronic device may further include an input device 1003 and an output device 1004. These components are connected with each other through a bus system and/or another form of connection mechanism (not shown).

For example, the input device 1003 may be a device such as a camera, a mouse, or a keyboard, for inputting image data and various commands. The input device 1003 may also be a communication network connector for receiving the image data and the various commands input from other devices connected to the electronic device.

The output device 1004 may output various information to the outside, including images output from various image transmission channels. The output device 1004 may include, for example, a display, a speaker, a printer, a communication network, and a remote output device connected by the communication network.

Certainly, for simplicity, FIG. 10 shows only some of components in the electronic device that are related to this disclosure, and components such as a bus and an input/output interface are omitted. In addition, according to specific application situations, the electronic device may further include any other appropriate components.

Exemplary Computer Program Product and Computer Readable Storage Medium

In addition to the foregoing method and device, the embodiments of this disclosure may also provide a computer program product, which includes computer program instructions. When the computer program instructions are run by a processor, the processor is enabled to perform the steps, of the method for synchronizing images from multiple channels according to the embodiments of this disclosure, that are described in the "exemplary method" part described above.

The computer program product may be program code, written with one or any combination of a plurality of programming languages, that is configured to perform the operations in the embodiments of this disclosure. The programming languages include an object-oriented programming language such as Java or C++, and further include a conventional procedural programming language such as a "C" language or a similar programming language. The program code may be entirely or partially executed on a user computing device, executed as an independent software package, partially executed on the user computing device and partially executed on a remote computing device, or entirely executed on the remote computing device or a server.

In addition, the embodiments of this disclosure may further relate to a computer readable storage medium, which stores computer program instructions. When the computer program instructions are run by a processor, the processor is enabled to perform the steps, of the method for synchronizing images from multiple channels according to the embodiments of this disclosure, that are described in the "exemplary method" part described above.

The computer readable storage medium may be one readable medium or any combination of a plurality of readable media. The readable medium may be a readable signal medium or a readable storage medium. The readable storage medium includes, for example, but is not limited to electricity, magnetism, light, electromagnetism, infrared ray, or a semiconductor system, an apparatus, or a device, or any combination of the above. More specific examples (a non-exhaustive list) of the readable storage medium include: an electrical connection with one or more conducting wires, a portable disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above.

Basic principles of this disclosure are described above in combination with specific embodiments. However, advantages, superiorities, and effects mentioned in this disclosure are merely examples but are not for limitation, and it cannot be considered that these advantages, superiorities, and effects are necessary for each embodiment of this disclosure. In addition, specific details described above are merely for examples and for ease of understanding, rather than limitations. The details described above do not limit that this disclosure must be implemented by using the foregoing specific details.

A person skilled in the art may make various modifications and variations to this disclosure without departing from the spirit and the scope of this application. In this way, if these modifications and variations of this application fall within the scope of the claims and equivalent technologies of the claims of this disclosure, this disclosure also intends to include these modifications and variations.

What is claimed is:

1. A method for synchronizing images from multiple channels, comprising:
    determining, from at least two image transmission channels, target image data corresponding to a target image transmission channel at a preset timepoint;
    determining a mounting status of a frame identifier of the target image data;
    determining integrity information of the target image data based on the mounting status;
    determining, based on the integrity information, an arrangement order of image data in an image data sequence to which the target image data belongs;
    generating the frame identifier of the target image data based on the arrangement order; and
    generating, based on the frame identifier, a to-be-output image corresponding to each image transmission channel in the at least two image transmission channels, and outputting the to-be-output image.

2. The method according to claim 1, wherein the determining, based on the integrity information, an arrangement order of image data in an image data sequence to which the target image data belongs comprises:
    determining a repairable status of the target image data based on the integrity information; and
    determining, based on the repairable status, the arrangement order of the image data in the image data sequence to which the target image data belongs.

3. The method according to claim 2, wherein the determining, based on the repairable status, the arrangement order of the image data in the image data sequence to which the target image data belongs comprises:
    repairing the target image data if the repair status represents a repairable status; and
    adjusting the arrangement order of the image data in the image data sequence to which the repaired target image data belongs.

4. The method according to claim 2, wherein the method further comprises:
    discarding the target image data if the repair status indicates that the target image data is irreparable, and discarding image data corresponding to the preset timepoint that is transmitted in the at least two image transmission channels.

5. The method according to claim 1, wherein the generating, based on the frame identifier, a to-be-output image corresponding to each image transmission channel in the at least two image transmission channels, and outputting the to-be-output image comprises:
    processing the target image data by using a pre-configured image processing model, to obtain a target processed image;
    determining a target to-be-output image based on the target processed image;
    obtaining, from other channels except the target image transmission channel among the at least two image transmission channels, to-be-output images that are processed by using the image processing model and that correspond to a frame identifier of the target to-be-output image, respectively; and
    outputting the target to-be-output image and the obtained to-be-output images.

6. The method according to claim 5, wherein the determining a target to-be-output image based on the target processed image comprises:
    reordering the target processed image and a historical processed image in response to that a frame identifier of the target processed image and a frame identifier of the historical processed image in the target image transmission channel are out of order; and
    determining, from the target processed image and the historical processed image that are reordered, a processed image corresponding to a frame identifier for a current output round as the target to-be-output image.

7. The method according to claim 5, wherein the processing the target image data by using a pre-configured image processing model, to obtain a target processed image comprises:
    processing the target image data by using the image processing model, to obtain an initial processed image;
    determining whether image quality of the initial processed image is qualified;
    determining whether the initial processed image is repairable, if the image quality is unqualified; and
    repairing the initial processed image to obtain the target processed image if the initial processed image is repairable.

8. The method according to claim 7, wherein after the determining whether the initial processed image is repairable, the method further comprises:
    discarding the initial processed image if the initial processed image is irreparable, and discarding image data in the at least two image transmission channels that corresponds to a frame identifier of the initial processed image.

9. A non-transitory computer readable storage medium, wherein the storage medium stores a computer program, and the computer program is used to be executed by a processor to implement a method for synchronizing images from multiple channels, wherein the method comprises:

determining, from at least two image transmission channels, target image data corresponding to a target image transmission channel at a preset timepoint;

determining a mounting status of a frame identifier of the target image data;

determining integrity information of the target image data based on the mounting status;

determining, based on the integrity information, an arrangement order of image data in an image data sequence to which the target image data belongs;

generating the frame identifier of the target image data based on the arrangement order; and generating, based on the frame identifier, a to-be-output image corresponding to each image transmission channel in the at least two image transmission channels, and outputting the to-be-output image.

10. The non-transitory computer readable storage medium according to claim 9, wherein the determining, based on the integrity information, an arrangement order of image data in an image data sequence to which the target image data belongs comprises:

determining a repairable status of the target image data based on the integrity information; and determining, based on the repairable status, the arrangement order of the image data in the image data sequence to which the target image data belongs.

11. The non-transitory computer readable storage medium according to claim 10, wherein the determining, based on the repairable status, the arrangement order of the image data in the image data sequence to which the target image data belongs comprises:

repairing the target image data if the repair status represents a repairable status; and adjusting the arrangement order of the image data in the image data sequence to which the repaired target image data belongs.

12. The non-transitory computer readable storage medium according to claim 10, wherein the method further comprises:

discarding the target image data if the repair status indicates that the target image data is irreparable, and discarding image data corresponding to the preset timepoint that is transmitted in the at least two image transmission channels.

13. The non-transitory computer readable storage medium according to claim 9, wherein the generating, based on the frame identifier, a to-be-output image corresponding to each image transmission channel in the at least two image transmission channels, and outputting the to-be-output image comprises:

processing the target image data by using a pre-configured image processing model, to obtain a target processed image;

determining a target to-be-output image based on the target processed image;

obtaining, from other channels except the target image transmission channel among the at least two image transmission channels, to-be-output images that are processed by using the image processing model and that correspond to a frame identifier of the target to-be-output image, respectively; and outputting the target to-be-output image and the obtained to-be-output images.

14. The non-transitory computer readable storage medium according to claim 13, wherein the determining a target to-be-output image based on the target processed image comprises:

reordering the target processed image and a historical processed image in response to that a frame identifier of the target processed image and a frame identifier of the historical processed image in the target image transmission channel are out of order; and determining, from the target processed image and the historical processed image that are reordered, a processed image corresponding to a frame identifier for a current output round as the target to-be-output image.

15. The non-transitory computer readable storage medium according to claim 13, wherein the processing the target image data by using a pre-configured image processing model, to obtain a target processed image comprises:

processing the target image data by using the image processing model, to obtain an initial processed image;

determining whether image quality of the initial processed image is qualified;

determining whether the initial processed image is repairable, if the image quality is unqualified; and repairing the initial processed image to obtain the target processed image if the initial processed image is repairable.

16. The non-transitory computer readable storage medium according to claim 15, wherein after the determining whether the initial processed image is reparable, the method further comprises:

discarding the initial processed image if the initial processed image is irreparable, and discarding image data in the at least two image transmission channels that corresponds to a frame identifier of the initial processed image.

17. An electronic device, wherein the electronic device comprises:

a processor; and a memory, configured to store processor-executable instructions, wherein the processor is configured to read the executable instructions from the memory, and execute the instructions to implement a method for synchronizing images from multiple channels, wherein the method comprises:

determining, from at least two image transmission channels, target image data corresponding to a target image transmission channel at a preset timepoint;

determining a mounting status of a frame identifier of the target image data;

determining integrity information of the target image data based on the mounting status;

determining, based on the integrity information, an arrangement order of image data in an image data sequence to which the target image data belongs;

generating the frame identifier of the target image data based on the arrangement order; and generating, based on the frame identifier, a to-be-output image corresponding to each image transmission channel in the at least two image transmission channels, and outputting the to-be-output image.

\* \* \* \* \*